April 8, 1924. 1,489,940
S. HILLER
PROCESS AND APPARATUS FOR TREATING ORGANIC MATERIALS TO MAKE MEAL AND OILS
Filed May 7, 1923 2 Sheets-Sheet 1

Inventor
Stanley Hiller
By William A. Strauch
Attorney

April 8, 1924.

S. HILLER 1,489,940

PROCESS AND APPARATUS FOR TREATING ORGANIC MATERIALS TO MAKE MEAL AND OILS

Filed May 7, 1923

Inventor
Stanley Hiller

By William A. Strauch
Attorney

Patented Apr. 8, 1924.

1,489,940

UNITED STATES PATENT OFFICE.

STANLEY HILLER, OF SAN JOSE, CALIFORNIA, ASSIGNOR TO STANLEY HILLER, INC., OF SAN JOSE, CALIFORNIA.

PROCESS AND APPARATUS FOR TREATING ORGANIC MATERIALS TO MAKE MEAL AND OILS.

Application filed May 7, 1923. Serial No. 637,285.

*To all whom it may concern:*

Be it known that STANLEY HILLER, a citizen of the United States, residing at San Jose, in the county of Santa Clara and State of California, has invented certain new and useful Improvements in Processes and Apparatus for Treating Organic Materials to Make Meal and Oils, of which the following is a specification.

This invention relates to a process and apparatus for the manufacture of meal, and the recovery of oil from fish, or fish waste, garbage, vegetables, grains, seeds and like materials.

More particularly the invention relates to a continuous process of manufacturing meal and the extraction of oil from materials of the character above mentioned, by use of a compact, novel combination of apparatus.

Heretofore it has been common to recover the oil and manufacture meal of the character mentioned in a discontinuous manner, with the apparatus spread out over a relatively large area. The material has been cut to proper size and stored or placed in containers to be carried to a cooker. After cooking it has again been placed or stored in containers and in due course been carried to presses. From the presses the residue has been carried, after a suitable amount has accumulated, to a drying means. Between each step the material is stored a more or less indefinite period depending on many factors. The result is that after being freshly cut, the material is subject to rapid decomposition, becoming more or less depreciated in quality for certain purposes, and extremely objectionable because of the odors and menace to the health of the operatives in the plant and the people compelled to remain in the vicinity. After cooking, the same nuisances are aggravated by further decomposition and odors, and the material becomes cooled before it reaches the press, making the oils more viscous, and lowering the extracting efficiency of the press. Further aggravation of the nuisances occurs by the manner of completing the remaining stages in the manufacture of meal. Further and serious objections to the methods heretofore used are the high cost of the apparatus, the high cost of labor necessarily incident thereto, and the great amount of space and building necessary to house such a plant. The cost of such apparatus and expense of their operation have been prohibitive for their use by smaller canneries and packers, in disposing of waste materials. In establishments large enough to warrant the expenditure, the nuisance created by the old meal manufacturing plants and processes have practically prevented their use in close proximity to the plants where the foods are being prepared and packed. Necessity of removing the waste materials to a more or less remote point from the canning or packing plant, increases the deterioration of the product even before the material reaches the cutter.

An object of the present invention is to provide a novel and more efficient process of manufacturing meal which may be used as fertilizer or food. Another object of the invention is to provide a novel apparatus for carrying out this process in a manner to substantially eliminate the above mentioned nuisances incident to older methods of manufacture. A further object of the invention is to provide an efficient apparatus for carying out the novel process continuously and in a manner to avoid all manual handling of the materials during the treating process. Other objects of the invention are to combine the apparatus in a compact self contained unit adaptable to wide ranges in capacity, operable in close proximity to canneries; of sufficiently low cost to place the plant within the profitable range of operation for a small cannery or packer; and such other objects as will appear in the following detailed description and claims.

Referring to the drawings.

Figure 1:
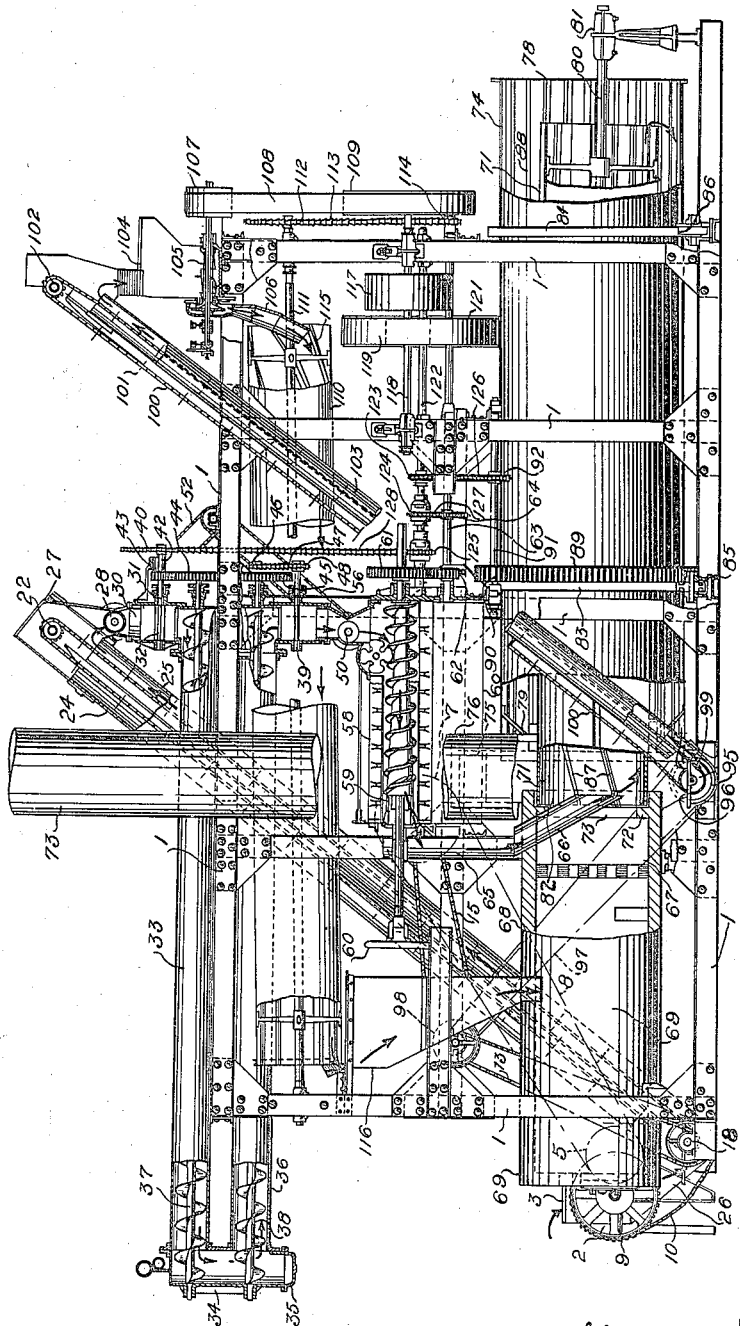
Figure 1 is a side elevation of the apparatus partially in section, with parts broken away, and diagrammatic showings in order to show the general arrangement.
Figure 2:
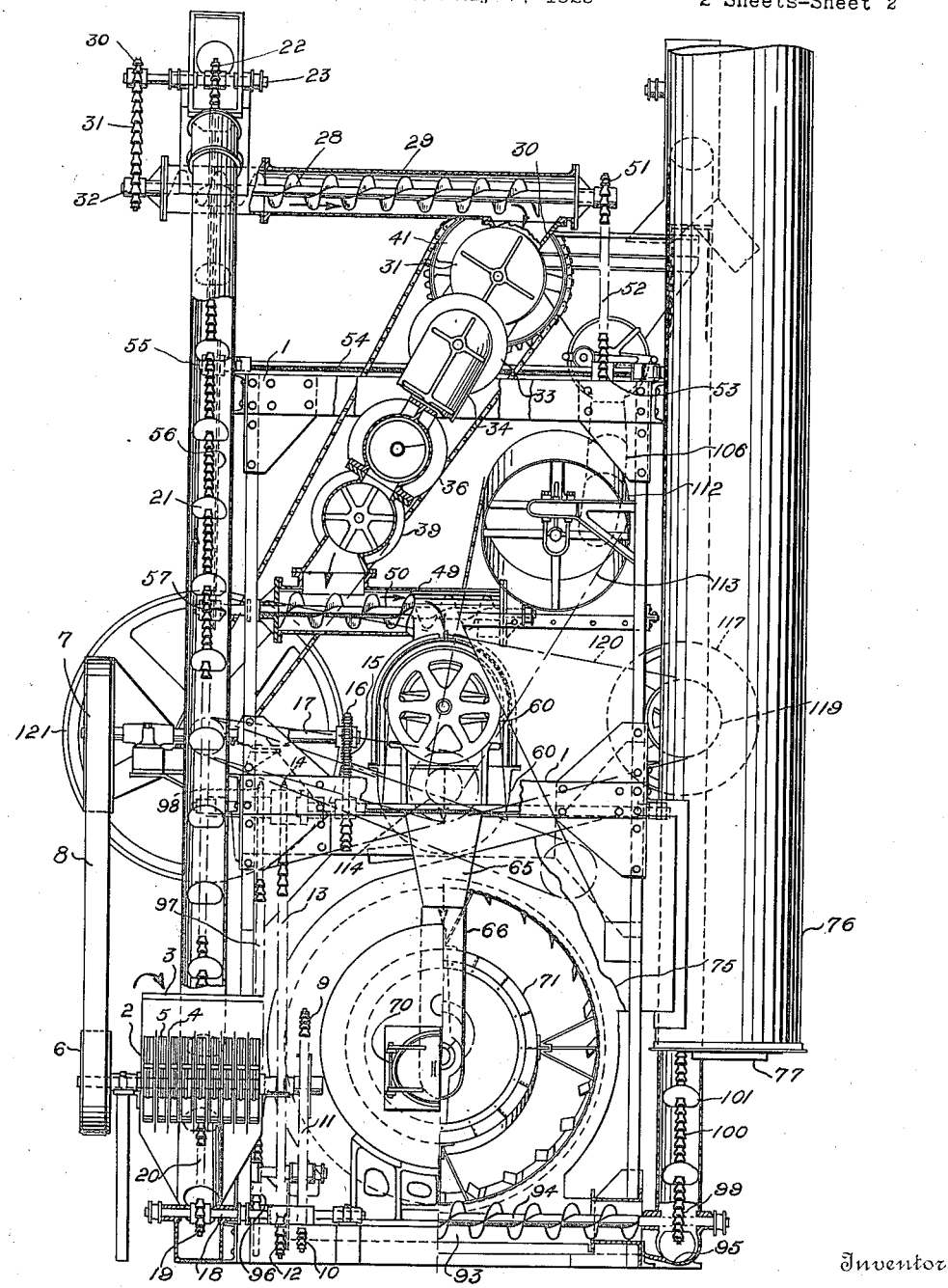
Figure 2 is an end elevation of the apparatus, with parts broken away, and parts shown in section.

The apparatus is supported on a suitable frame 1 made up of standard steel channels and other iron work sections secured together by the usual gussets, bolts, and rivets, or in any other well known manner. This frame work, as shown in the drawing, is arranged to support the entire apparatus without the necessity of constructing special foundations therefor.

A cutter 2, supported from the frame work is provided with a hopper 3 and a series of blades 4. Coacting with blades 4 are a series of pusher or star wheels 5. Rotation of star wheels 5 forces the material in the hopper against the edges of the blades 4. The cutter blades 4 are driven by a pulley 6 from a pulley 7 through a belt 8, and the star wheels 5 are driven by a sprocket wheel 9, from a sprocket 10 through a chain 11. Sprocket wheel 10 is in turn driven through a sprocket wheel 16, chain 15, wheel 14, chain 13 and wheel 12. Pulley 7 and sprocket 16 are secured to shaft 17 which is suitably journaled on frame 1. Shaft 17 is driven from the main driving shafts in a manner to be hereinafter described.

Sprocket 12 drives countershaft 18 upon which is mounted sprocket 10 and a sprocket 19. Sprocket 19 drives an elevating conveyor chain 20 to which are secured at regularly spaced intervals a series of conveyor scrapers 21. At the upper end the conveyor chain is supported by a sprocket 22 which is journaled in a shaft 23. This conveyor is completely inclosed by cylindrical casings 24 and 25 which at their lower end communicate with the discharge chamber 26 of the cutter, and at their upper end open into a conveyor discharge chamber 27. It will be noted that this conveyor is entirely inclosed and joins directly with the cutter casing. The conveyor discharge chamber communicates with a spiral conveyor screw 28, so that the discharge from the scraper conveyor falls by gravity into the screw conveyor. Screw 28 is inclosed in a cylindrical casing 29 and journaled in end castings of this casing. A sprocket wheel 30, carried by shaft 23 drives screw 28 to move the materials along 29 and discharge them into the hopper 30 of cooker feed valve 31. Valve 31 comprises a rotatable star wheel and permits a continuous feed of materials into upper cooker section 33 without lowering the pressure in the cooker. Cooker section 33 is joined to cooker section 36 by an endpiece 34. Endpiece 34 is provided with a removable receptacle or sump 35 for the collection of foreign objects. Screws 37 and 38 are suitably journaled for rotation in sections 33 and 36. At its discharge end, section 36 communicates with a discharge valve 39, similar in structure to feed valve 31. For a more complete disclosure of the cooker construction, reference may be had to copending application, Serial No. 630,041, filed April 5, 1923. Valve 31 is driven by a sprocket 40 mounted on a shaft 42. Cooker conveyor screws 37 and 38 are driven by pinion 43 secured to shaft 42, through gears 44 and 45 respectively. Discharge valve 39 is driven by sprocket wheel 46 through chain 47 and sprocket wheel 48.

Valve 39 communicates with a press feed screw conveyor chamber 49 in which is mounted a feed screw 50. Screw 50 is driven from conveyor screw 28 by means of sprocket 51, chain 52, sprocket 53, shaft 54, sprocket 55, chain 56 and sprocket 57. At its discharge end, chamber 49 communicates with a press 58.

This press is of special construction in order to permit the withdrawal of the press screw 59 for cleaning purposes by the rotation of hand wheel 60. A series of openings or perforations are provided in the walls of press 59, through which the fluids expressed by rotation of screw 59, pass to the collecting pan or receptacle 60. The fluid may be allowed to settle in the pan 60 for the purpose of separating the oils, or it may be drawn off and treated in any well known manner to effect the separation of the oil therefrom. Screw 59 is driven from a gear 61 through a sliding key connection. Gear 61 is driven by pinion 62 mounted on shaft 63 which in turn is driven by sprocket 64.

The discharge end of press 59 communicates with a hopper 65, which in turn communicates with a dryer feed chute 66. The solid materials discharge from the press through chute 66 to the dryer. Chute 66 passes through a combustion chamber 67 of a furnace 68. Furnace 68 is equipped with a fire chamber 69, and doors 70. In the preferred embodiment oil burners are used as the firing means, but it is obvious that the furnace may be equipped with any common fuel consuming arrangement. It is also apparent that provision may here be made for generating steam to be used in the cooker, or this steam may be generated in an independent unit, or exhaust steam from other apparatus may be used.

Dryer feed chute 66 is arranged to drop the materials into the inner cylinder 71 of a dryer. An end wall 72 of the combustion chamber is provided with an opening 73 communicating with the cylinder 71 and the hot gases and products of combustion from the furnace pass through inner cylinder 71 to outer cylinder 74 of the dryer, and then back through cylinder 74, and together with gases given off by the materials in the dryer pass through chamber 75 and out of the stack 76. Stack 76 is provided with a removable bottom cleaning cover 77. At one end a plate 78 closes outer cylinder 74, and at the other end cylinder 74 projects into stack base chamber 75. Mechanical seals of usual construction are provided to permit rotation of cylinder 74 in a manner hereinafter described, without permitting leakage at the junction of the stack base chamber 75 and cylinder 74. Cylinder 71 is mounted at one end in cylinder 74 by means of suitably constructed supports 79, and is supported at the opposite end by shaft 80 and journal 81. At one end cylinder 71 is fitted into a recessed portion 82 of the furnace 69, in a manner to force the products of combustion from the furnace through cylinder 71 before they can reach the stack and at the same time permitting rotation of 71. Cylinder 74 is rotatably supported by tires 83 and 84 on roller bearings or cradles 85 and 86 in a manner to have a downward slope or pitch from right to left in Figure 1. Cylinder 71, on the other hand is supported in 79 and 81 in a manner to have a downward pitch from left to right in Figure 1. Members 87 and 88 are secured to the inner walls of cylinders 71 and 74 respectively, and turn over the material in the drier in order to present constantly changing surfaces to the action of the hot gases. This continued agitation of the material tends to prevent burning of the materials and insures thorough drying thereof. Members 87 and 88 may be applied to the cylinders in the form of helices to govern, in a measure, the rate of progress of material through the drier; other factors governing this rate being the respective pitches of cylinders 71 and 74 and their speed of rotation. The ends of members 87, or some of them, nearest the combustion chamber may be applied with a shorter pitch than the more remote ends, as shown in Figure 1, in order to make the progress of the wet materials through the hottest zone of the drier relatively faster than through the cooler zones. It will be obvious that the arrangement of members 87 and 88 may be changed to vary the speed of passage of the material at different points within the drier by varying the pitch 87 and 88 in any desired manner. Rotation of the drier is effected by means of a spur gear 89 secured to cylinder 74. Gear 89 is driven by sprocket wheel 92 through shaft 91 and pinion 90. Inner cylinder 71 is driven from cylinder 74 by means of supports 79, supports 79 being constructed to permit the slight relative movements of 71 and 74 during rotation caused by the fact that the cylinders are pitched in opposite directions.

The arrangement of the drier is particularly important, because of the tendency of the hot gases to cause burning of the materials which would result in waste and a considerable depreciation in value of the product. It will be noted that the wet materials from the press are protected from direct contact with hot gases by chute 66 as they are fed into the drier. The materials then drop behind projection 72 which creates a zone of relative protection from direct contact, until the materials are sufficiently heated to cause steam to be generated due to the moisture present therein. The generation of steam will then lower the temperature immediately surrounding the material to about 212 degrees F. due to the heat absorbed in vaporizing the moisture. By the time the material has moved along the drier far enough to come into the direct blast from the combustion chamber, the absorption of heat due to vaporization has cooled the gases, and the protective vapor formed is sufficient to protect the material from burning. The drier the material becomes, the cooler are the gases in contact therewith. It will be seen that efficient drying constitutes a valuable feature of the present combination of apparatus and of the process.

The material passes through cylinder 71 from left to right in Figure 1, and back through cylinder 74 from right to left. From cylinder 74 it drops into a screw conveyor trough 93, and is then conveyed by screw 94, to feed hopper 95 of an elevating scraper conveyor. Screw 94 is driven by a sprocket wheel 96 from a chair 97 and sprocket 98. Driven by screw 94 is a conveyor drive sprocket 99. Sprocket 99 drives a chain 100 carrying scraper flights and supported at its upper end by a conveyor head sprocket 102. Supported from the frame work 1 and surrounding the lower conveyor limb is a cylindrical body member 103 which communicates at its lower end with hopper 85 and at its upper end with a grinder feed hopper 104. As screw 94 is rotated, sprocket 99 drives chain 100 in a manner to cause flights 101 to carry the materials discharged from the drier upward through 103 and discharges them into the grinder hopper 104. Since the materials have been thoroughly dried and there is consequently no danger of offensive odors therefrom, there is no necessity for encasing the upper limb of conveyor chain 100. It will of course be understood that this may be done if desired.

The materials fed into 104 are disintegrated and reduced to a meal by rotation of grinder member 105 and crushing against serrated surfaces, and the meal is discharged into cooler feed chute 106. Grinder member 105 is driven by pulley 109 through belt 108 and pulley 107. From 106 the materials pass through a cooler comprising a cylinder 110 which is supported and driven from a shaft 111. Shaft 111 is suitably journaled from the frame work 1 and is driven from a sprocket wheel 114 through chain 113 and wheel 112. Members 115 are applied to the inner surface of cylinder 110 in helical form to agitate the material and govern its rate of travel through the cooler. The cooling cylinder is also given a downward pitch from right to left in Figure 1. The meal in passing through the cooler is cooled to a point where it may be immediately sacked from a storage bin 116 into which it is discharged by the cooler.

The driving of the plant is an essential feature of the apparatus as it will be apparent that all of the mechanism has been placed in such a relation that the lack of proper functioning of any element of the combination vitally affects the functioning of each of the other elements entering into the combination. This dependency of operation and coaction of the various elements is accentuated by the fact that the material is substantially entirely inclosed from the time it is put into the cutter until it leaves the cooler. A failure of any element in the combination to complete its functions at the proper speed will result in an eventual clogging and stoppage of the plant. This necessitates the establishment of fixed rates of speeds for each piece of apparatus within definite limits and it will be noted that the various mechanisms are driven in such a manner that the speed relations are fixed. Although driving from a common source of power is not essential, it is to be preferred because of the advantage to be gained in efficiency due to the fact that the relative speeds can be fixed in the manufacture, and will require no further regulation. The speed of operation may then be varied by varying the driving speed of the common source, the speeds and capacities if the various elements of the apparatus being so arranged, that regardless of speed variations within reasonable limits, the process will be continuous and clogging can not result. Driving power is applied by a prime mover of any well known type such as an electric motor or steam engine to a main drive pulley 117, through a belt (not shown). Pulley 117 is mounted on and drives a shaft 118. Shaft 118 drives pulleys 109 and 119 secured rigidly thereto. Pulley 119 drives pulley 121 through belt 120. Pulley 121 is mounted on and drives shaft 122 upon which sprockets 123, 124 and 125 are mounted. Sprockets 123, 124 and 125, drive sprockets 92, 64 and 40, respectively, through chains 126, 127, and 128. Shaft 122 is extended and through a worm or gear connection (not shown) drives shaft 17 upon which are mounted pulley 7 and sprocket 16.

*Operation and process.*

Having described the mechanical details of the apparatus, the method operation and process carried out thereby will be set forth. The apparatus is preferably set up in close proximity to the cannery, packing plant, or other source of materials to be treated, so that the material, usually waste from the canning or packing operations, may be fed by conveyors directly from the cutting tables of the plant to the cutter hopper 3. In this manner, a cannery or other plant may be kept free of refuse and offal during operation. The material is forced against the rotating knives of the cutter by the cutter star wheel, and is cut into pieces of proper size for efficient cooking and expressing. The freshly cut material drops into the conveyor and is elevated as cut and dropped into the cooker feed screw conveyor. It is then carried to and dropped into the constantly rotating cooker feed valve.

The proper cooking temperature for the particular material to be treated is maintained in the cooker, by steam admitted thereto under suitable pressure. It will of course be understood that different materials will require different cooking temperatures. Salmon and herring, for example, for efficient operation, should not be cooked at the same temperature. It is also well known that different pressures of steam correspond to different temperatures. Constant pressure is maintained in the cooker by the use of reducing valves or any other common expedient, and the cooker pressure necessary for the different temperatures is obtained by adjusting the reducing valves or by other well known expedients. By reason of the fact that the feed and discharge valves of the cooker comprise rotary members with vanes, steam under pressure is discharged from the pockets between the vanes, as the valves are rotated. This steam from the feed valve is forced to enter the cooker feed conveyor and is there utilized to precook the material. Waste of steam is thereby prevented, and the structure of the conveyor overcomes the tendency of this discharged steam to cause "spitting" or blowing away of the materials from the feed valve.

The material is fed continuously through the upper section of the cooker, drops by gravity to the lower section of the cooker and is carried to the discharge valve. During the process of cooking, the oil bearing cellular structure of the material is to a large extent broken down and the oil is freed therefrom so that it may be more easily separated from the residue which is converted into meal. As the material drops from the upper to the lower section, foreign objects such as tools and like objects which have been carelessly dropped into the material, collect in the sump 35 from which they may be periodically removed. The provision of this means for collecting such foreign objects is of great importance, as otherwise serious injury would be occasioned thereby to the press or grinder. The cooked material is discharged continuously from the rotating discharge valve into the press feed screw conveyor. The steam escaping in the pockets of discharge valve is forced into the press feed conveyor and is utilized to further cook and heat the materials in their passage to the press.

The heated materials are fed into the continuously operating press, and while passing through the press, the liquids are to a large extent pressed out. Attention is here directed to the increased efficiency of expressing the oils from heated materials over that attainable in the prior processes. The pressing, while hot, and particularly from materials maintained in heated condition until they enter the press by the waste steam from the discharge valve, results in an increased percentage of extraction, due to the increased fluidity of the oils at higher temperature, and also due to the moistening of the material by the condensing of steam in the press feed conveyor.

The liquids are collected in the pan and the oil separated therefrom by settling or in any well known manner. The solid residue passes from the press into the drier, and although introduced into the hottest gases from the combustion chamber of the drier furnace, the manner of introduction is such, and the structure of the drier is so arranged, that, as heretofore pointed out, the material is thoroughly dried without being burned.

From the drier, the material is discharged in heated condition into an elevating conveyor. In the conveyor the material is protected from the cooling action of the air, and while hot, is elevated and discharged into the grinder. The hot material is disintegrated and reduced to a meal in the grinder and the meal is continuously discharged into the cooler. The grinding of the materials while hot is an improvement over prior processes, as the material is thoroughly dry while it passes through the grinder, and a better quality and texture of meal results.

The material is passed through the cooler at a rate which insures its being cooled to the point where it may be immediately sacked from the storage hopper to which the cooler delivers it, and may then be immediately removed from the vicinity.

It will be apparent that a compact and efficient plant has been provided for the recovery of oils from materials and the manufacture of meal, in which the material is continuously treated and deodorized, or decomposition is prevented during treating until the meal is thoroughly dried and sacked. It is well known that thoroughly dried materials are substantially odorless and not subject to the rapid decomposition which occurs in the wet materials. During the process, germination is prevented by the substantial exclusion of atmospheric contact, and the application of heat completely destroys all bacteria which may exist in the material before it reaches the cutter. The quality and character of the materials treated determines to a large extent the use to which the meal is put. If of sufficiently high grade, the meal may be used as a food product. Regardless of grade, it may be used as a fertilizer, and the grade of fertilizer may be made of a desired standard or quality by the addition of suitable phosphates or nitrates.

Having described a preferred embodiment of the invention what is desired to be secured by Letters Patent and claimed as new is:

1. The process of manufacturing fertilizer from materials of oil bearing cellular structure which comprises cutting the material to be treated to suitable size, cooking the cut material under a pressure different from atmospheric pressure; expressing the cooked material; drying and deodorizing the solid material by the application of heat, and grinding the dried material to reduce it to a meal.

2. The process of treating materials of oil bearing cellular structure which comprises cutting the materials to suitable size; cooking the cut materials; pressing the cooked materials to extract the oils; drying the solid materials, grinding the dried materials, and cooling the ground materials.

3. The process as set forth in claim 2 in which the various steps are carried out in continuous manner.

4. The process of treating organic oil bearing materials which comprises the steps of reducing the materials to proper size for treatment; feeding the freshly reduced materials under cover to a cooker; cooking the materials, and treating organic oil bearing the cooked materials to produce meal.

5. The process as set forth in claim 4 in which the steps of reducing feeding, and cooking are continuously carried out.

6. The process of treating organic oil bearing materials which comprises feeding materials to a cooker under cover; preheating the materials during the feeding; cooking the preheated materials; treating organic oil bearing the cooked materials to extract the oils contained therein; and treating the solid residue to produce meal.

7. The process as set forth in claim 6 in which the materials are cooked under pressure.

8. The process as set forth in claim 7 in which the material is continuously fed through the cooker and reduced to a soft cooked state, and foreign objects are separated from the soft material in its passage through the cooker.

9. The process as set forth in claim 6 in which the cooking is accomplished by the use of steam, and waste steam from the cooker is utilized to preheat the materials during feeding.

10. The process as set forth in claim 7 in which the cooker pressure is varied to produce the proper temeperature for thorough cooking of the materials.

11. The process of treating oil bearing materials which comprises the steps of cooking the materials by means of steam under pressure; feeding the cooked materials under cover while hot from the cooker to a press; heating the materials by utilization of waste steam from the cooker while feeding it to the press; pressing the materials while hot to extract the liquid therefrom; drying the solid residue from the press in direct contact with heated products of combustion; and treating the dried residue to produce meal.

12. The process as set forth in claim 11 in which the feeding of the materials is carried out continuously.

13. The process of treating materials which comprises the steps of expressing the materials to separate the oils therefrom; drying the solid residue by the direct application of heated gases of combustion in a manner to prevent burning thereof; and treating the dry residue while hot to produce meal therefrom.

14. The process as set forth in claim 13 in which the materials are fed under cover from the press to the dryer.

15. The process as set forth in claim 14 in which the materials are heated while being fed from the press to the dryer.

16. The process as set forth in claim 15 in which hot gases from the dryer are utilized to heat the materials as they are fed from the press to the dryer.

17. The process as set forth in claim 14 in which the materials are fed into the hottest part of the dryer in a manner to be protected from burning, and advanced to the cooler parts of the dryer progressively as the drying proceeds, in a manner to protect the materials from burning.

18. The process as set forth in claim 17 in which the material is fed continuously from the press to the dryer.

19. The process of treating materials which comprises the steps of extracting oils therefrom by expressing; drying the solid residue; reducing the residue to a meal; and cooling the meal to permit immediate sacking thereof.

20. The process as set forth in claim 19 in which the hot residue is fed under cover from the dryer to a grinder wherein it is reduced to meal while hot.

21. The process as set forth in claim 20 in which the meal is maintained in heated condition while being fed to the grinder by action of the cover and heated gases escaping from the dryer.

22. The process as set forth in claim 21 in which the feeding of the material is continuous.

23. The process as set forth in claim 19 in which the meal is fed continuously to a cooler wherein the cooling occurs.

24. In a plant comprising a cutter, a cooker, a press, a dryer, a grinder, and a cooler, the method of operation which consists in feeding material through the cutter to the cooker while freshly cut; through the cooker under pressure; from the cooker to the press while hot; from the press to the dryer while moist; from the dryer through a grinder while hot; and from the grinder through the cooler.

25. The method of operation set forth in claim 24 in which the steps from cutting to cooling are carried automatically and in a manner to substantially exclude the access of air during the steps set forth.

26. The method as set forth in claim 25 in which the steps are continuously performed.

27. In a plant for treating oil bearing materials, the combination of a cutter, a cooker; a press; a dryer; a grinder and a cooler; connecting means between said cutter and said cooker, said cooker and said press; said press and said dryer, and said dryer and said cooler; and driving means to drive the whole at definite relative speeds in a manner to permit operation of each element to perform its function in the continuous automatic production of meal and extraction of oil from the materials treated.

28. The combination as set forth in claim 27 set up in a self contained unit and adapted to be driven from a single prime mover.

29. In a plant for treating oil bearing materials, the subcombination of a cutter, a cooker, and inclosed communicating means between said cutter and said cooker.

30. The subcombination as set forth in claim 29 in which the communicating means comprises conveying apparatus.

31. The subcombination as set forth in claim 30 in which the conveying apparatus comprises a scraper conveyor and a screw conveyor.

32. The subcombination as set forth in claim 30 and driving means for operating said cutter, said cooker and said conveying apparatus at definite relative speeds.

33. In a plant for treating oil bearing materials, the subcombination of a cooker feed conveyor; a cooker embodying feed and discharge valves; a discharge conveyor; and means forming inclosed communicating passages between said conveyors and said valves.

34. The subcombination as set forth in claim 33 and driving means for operating said cooker, said conveyors, and said valves at definite relative speeds.

35. The subcombination as set forth in claim 34 in which the conveyors are screw conveyors.

36. In a plant for treating materials, the subcombination of a dryer, a grinder, and means forming an inclosed communicating passage between said dryer and said grinder to maintain the materials discharged from said dryer in heated condition until fed into said grinder.

37. In a plant for treating materials, the subcombination of a grinder, a cooler, an inclosed communicating passage between said grinder and said cooler, and driving means for operating said grinder and said cooler at definite relative speeds.

Signed at San Jose, California, this 28th day of April 1923.

STANLEY HILLER.